United States Patent
Liu et al.

(10) Patent No.: US 11,874,901 B2
(45) Date of Patent: Jan. 16, 2024

(54) METHOD, DEVICE FOR PROCESSING NETWORK FLOW, STORAGE MEDIUM AND COMPUTER DEVICE

(71) Applicant: Hillstone Networks Co., Ltd., Jiangsu (CN)

(72) Inventors: Shuyi Liu, Jiangsu (CN); Yingjie Cui, Jiangsu (CN); Haixia Qu, Jiangsu (CN)

(73) Assignee: Hillstone Networks Co., Ltd., Jiangsu (CN)

( * ) Notice: Subject to any disclaimer, the term of this patent is extended or adjusted under 35 U.S.C. 154(b) by 0 days.

(21) Appl. No.: 17/043,714

(22) PCT Filed: Sep. 29, 2020

(86) PCT No.: PCT/CN2020/118964
§ 371 (c)(1),
(2) Date: Sep. 30, 2020

(87) PCT Pub. No.: WO2022/067539
PCT Pub. Date: Apr. 7, 2022

(65) Prior Publication Data
US 2023/0252108 A1    Aug. 10, 2023

(51) Int. Cl.
*G06F 18/231* (2023.01)
*G06F 9/455* (2018.01)

(52) U.S. Cl.
CPC ........ *G06F 18/231* (2023.01); *G06F 9/45558* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,734,629 B2 * | 6/2010 | Chakrabarti | ............ | G06F 18/23 |
| | | | | 707/751 |
| 8,930,365 B2 * | 1/2015 | Chakrabarti | ............ | G06F 18/23 |
| | | | | 707/737 |
| 10,796,243 B2 * | 10/2020 | Bellala | ................ | H04L 63/0227 |

(Continued)

FOREIGN PATENT DOCUMENTS

| | | |
|---|---|---|
| CN | 107733937 A | 2/2018 |
| CN | 108462675 A | 8/2018 |

(Continued)

OTHER PUBLICATIONS

Su et al.; "Hierarchical Clustering Based Network Traffic Data Reduction for Improving Suspicious Flow Detection"; IEEE 2018; (SU_2018.pdf; pp. 744-753) (Year: 2018).*

(Continued)

*Primary Examiner* — Hiren P Patel
(74) *Attorney, Agent, or Firm* — Gang Yu

(57) ABSTRACT

Provided are a method, device for processing a network flow and a storage medium and a computer device. The method includes that: a network flow is acquired, and the acquired network flow is taken as a discrete object; the discrete object is clustered to obtain a clustering result; and the clustering result is output. The disclosure solves the technical problem in related technologies that a basis for formulating a network control policy cannot be provided from complex network information due to a complex network topology.

14 Claims, 4 Drawing Sheets

A network flow is acquired, and the acquired network flow is taken as a discrete object — S102

The discrete object is clustered to obtain a clustering result — S104

The clustering result is output — S106

(56) References Cited

U.S. PATENT DOCUMENTS

| | | | |
|---|---|---|---|
| 10,891,148 B2* | 1/2021 | Kushmerick | G06F 9/45558 |
| 11,057,264 B1* | 7/2021 | Ghare | H04L 41/0654 |
| 11,436,074 B2* | 9/2022 | Dubey | G06F 11/079 |
| 11,550,691 B2* | 1/2023 | Muthusami | H04L 47/781 |
| 11,567,974 B2* | 1/2023 | Bandyopadhyay | G06N 3/088 |
| 2016/0219068 A1* | 7/2016 | Lee | G06N 20/00 |
| 2017/0053214 A1* | 2/2017 | Bellala | H04L 63/0227 |
| 2018/0131705 A1* | 5/2018 | Samadani | H04L 43/026 |

FOREIGN PATENT DOCUMENTS

| | | |
|---|---|---|
| CN | 110650058 A | 1/2020 |
| CN | 111224990 A | 6/2020 |
| WO | 2019191666 A1 | 10/2019 |

OTHER PUBLICATIONS

Song et al.; "Identifying Flow Clusters Based on Density Domain Decomposition"; IEEE, Digital Object Identifier 10.1109/ACCESS. 2019.2963107; (Song_2019.pdf; pp. 5236-5243) (Year: 2019).*

Wang et al.; "Clustering Analysis for Malicious Network Traffic"; IEEE ICC 2017 Communication and Information Systems Security Symposium; (Wang_2017.pdf; pp. 1-6) (Year: 2017).*

International Search Report for corresponding application PCT/CN2020/118964 filed Sep. 29, 2020; dated Jun. 24, 2021.

* cited by examiner

METHOD, DEVICE FOR PROCESSING NETWORK FLOW, STORAGE MEDIUM AND COMPUTER DEVICE

TECHNICAL FIELD

The disclosure relates to the field of network security, in particular to a method, device for processing a network flow, a storage medium and a computer device.

BACKGROUND

In the current Internet field, with the increase of network devices, network topologies are more and more complex, and it is more and more difficult to plan network control policies rationally. Especially in recent years, with the rapid development of data centers, the east-west flow in the data centers is huge and complex, which increases the difficulty of planning the network control policies. Network policy management through manpower alone is difficult to formulate and change effective, accurate and timely policies.

Based on the above problems, concepts of zero trust network and adaptive learning are proposed. Adaptive learning products often output network topologies in visual or command line form based on specific network information. However, in face to complex networks, simply displaying the network topologies cannot help a network administrator to formulate the network policies efficiently and rationally. Other methods have disadvantages such as expensive service and long computing cycle.

Aiming at the above problem, an effective solution has not been proposed yet.

SUMMARY

The embodiments of the disclosure provide a method, device for processing a network flow, a storage medium and a computer device to at least solve the technical problem in related technologies that a basis for formulating a network control policy cannot be provided from complex network information due to a complex network topology.

According to an aspect of the embodiments of the disclosure, a method for processing a network flow is provided, which includes the following operations. A network flow is acquired, and the acquired network flow is taken as a discrete object. The discrete object is clustered to obtain a clustering result. The clustering result is output.

As at least one alternative embodiment, the operation that the discrete object is clustered to obtain the clustering result includes that: a Hierarchical Agglomerative Clustering (HAC) method is used to cluster the discrete object to obtain the clustering result.

As at least one alternative embodiment, that the HAC method is used to cluster the discrete object to obtain the clustering result includes that: according to a source IP address and a destination IP address of the network flow as the discrete object, the HAC method is used to cluster the discrete object to obtain the clustering result.

As at least one alternative embodiment, when the network flow is the network flow transmitted in a network using a physical machine, an agglomeration distance used in the HAC method includes the Chebyshev distance.

As at least one alternative embodiment, when the network flow is the network flow transmitted in a cloud network using a Virtual Machine (VM), the agglomeration distance used in the HAC method is determined according to a first distance and a second distance, and the weights of the first distance and the second distance. The first distance is the distance between source VMs of two network flow for clustering, and the second distance is the distance between destination VMs of two network flow used clustering.

As at least one alternative embodiment, the operation that the clustering result is output includes that: when the network flow is the network flow transmitted in the network using the physical machine, the clustering result is output in the form of IP/Mask format; and when the network flow is the network flow transmitted in the cloud network using the VM, the clustering result is output in the form of address book.

As at least one alternative embodiment, the operation that the discrete object is clustered to obtain the clustering result includes that: a plurality of agglomeration distance ladder values are determined; and according to the plurality of agglomeration distance ladder values, the discrete object is clustered to obtain a plurality clustering results corresponding respectively to the plurality of agglomeration distance ladder values.

As at least one alternative embodiment, the operation that the discrete object is clustered to obtain the clustering result includes that: a clustering control parameter is obtained; according to the clustering control parameter, the discrete object is filtered to obtain a filtering result; and the filtering result is clustered to obtain the clustering result.

As at least one alternative embodiment, the clustering control parameter includes: a port of the network flow.

As at least one alternative embodiment, the operation that the acquired network flow is taken as the discrete object includes that: characteristic information of the network flow is extracted; the characteristic information is preprocessed to obtain a preprocessing result; and the preprocessing result is mapped to a point in a rectangular plane coordinate system, and the point is taken as the discrete object.

As at least one alternative embodiment, that the preprocessing result is mapped to a point in the rectangular plane coordinate system includes that: it is determined whether the degree of divergence of the characteristic information used for clustering reaches a predetermined threshold; when the degree of divergence of the characteristic information used for clustering reaches the predetermined threshold, coordinates of the preprocessing result are adjusted to obtain a preprocessing result after the coordinates are adjusted; and the preprocessing result after the coordinates are adjusted is mapped to a point in the rectangular plane coordinate system.

As at least one alternative embodiment, the method is applied to the flow control of a firewall.

According to another aspect of the embodiments of the disclosure, a device for processing a network flow is provided, which includes an acquiring component, a clustering component and an outputting component. The acquiring component is configured to acquire the network flow, and take the acquired network flow as the discrete object. The clustering component is configured to cluster the discrete object to obtain that clustering result. The outputting component is configured to output the clustering result.

According to yet another aspect of the embodiments of the disclosure, a computer-readable storage medium is provided, which includes a program stored. When running, the program controls a device where the storage medium is to execute the above method for processing a network flow.

According to still another aspect of the embodiments of the disclosure, a computer device is provided, which includes a memory and a processor. The memory stores a computer program. The processor is configured to execute the computer program stored in the memory. When running, the computer program makes the processor execute the above method for processing a network flow.

In the embodiments of the disclosure, by taking the network flow as the discrete object, clustering the discrete object and outputting the clustering result, the purpose of providing a basis for formulating a network control policy is achieved. Consequently, the technical effect of efficiently and reasonably formulating a network control policy is realized, and the technical problem in related technologies that a basis for formulating a network control policy cannot be provided from complex network information due to a complex network topology is solved.

BRIEF DESCRIPTION OF THE DRAWINGS

The accompanying drawings described here are used for providing further understanding of the disclosure, and constitute a part of the present application. Schematic embodiments of the disclosure and description thereof are used for illustrating the disclosure and not intended to form an improper limit to the disclosure. In the accompanying drawings.

DETAILED DESCRIPTION OF THE EMBODIMENTS

In order to make those skilled in the art understand the solutions of the disclosure better, the technical solutions in the embodiments of the disclosure are clearly and completely elaborated below in combination with the accompanying drawings. It is apparent that the described embodiments are only a part of the embodiments of the disclosure but not all. Based on the embodiments of the disclosure, all the other embodiments obtained by those of ordinary skill in the art on the premise of not contributing creative effort should belong to the protection scope of the disclosure.

It is to be noted that the terms like "first" and "second" in the specification, claims and accompanying drawings of the disclosure are used for differentiating the similar objects, but do not have to describe a specific order or a sequence. It should be understood that the objects may be exchanged under appropriate circumstances, so that the embodiments of the disclosure described here may be implemented in an order different from that described or shown here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

First of all, some of the nouns or terms appearing in the description of the embodiments of the present application are applied to the following explanations.

Network flow is a data flow transmitted over a network. Each specific network flow has some parameters, such as a source IP address, a destination IP address, a source port number and a destination port number.

Cluster is a concept of cluster analysis, referring to a group obtained after grouping physical or abstract objects. A cluster may include one or more objects.

Chebyshev distance is a measure of distance in coordinate space. The distance between two points is defined as the maximum absolute value of the difference between their coordinate values.

Embodiment 1

According to the embodiments of the disclosure, a method for processing a network flow is provided. It is to be noted that these steps presented in the flowchart of the accompanying drawings can be executed in a computer system like a group of computer executable instructions, and moreover, although a logical sequence is shown in the flowchart, in some cases, the presented or described steps can be performed in a sequence different from that described here.

Figure 1:
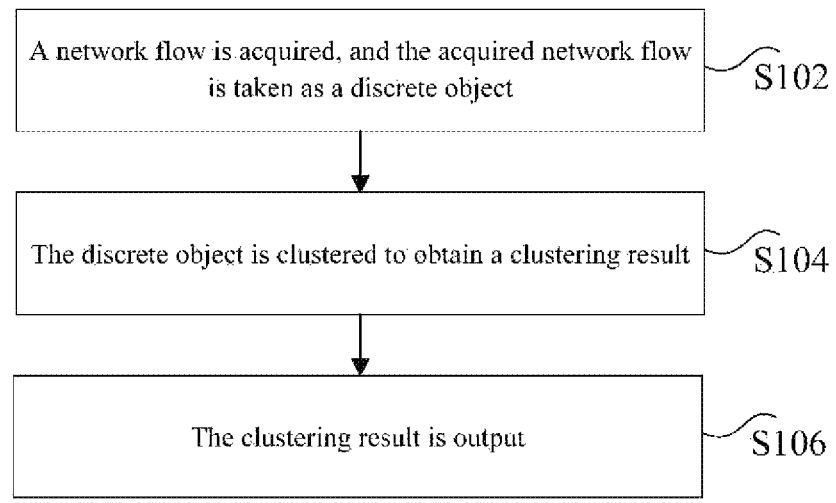
FIG. 1 is a flowchart of a method for processing a network flow according to an embodiment of the disclosure.

FIG. 1 is a flowchart of the method for processing a network flow according to an embodiment of the disclosure. As shown in FIG. 1, the flow includes the following steps.

At S102, a network flow is acquired, and the acquired network flow is taken as a discrete object.

At S104, the discrete object is clustered to obtain a clustering result.

At S106, the clustering result is output.

Through the above steps, by taking the network flow as the discrete object, clustering the discrete object and outputting the clustering result, the purpose of providing a basis for formulating a network control policy is achieved. Because the clustering result shows the commonality of some network flow, when the network control policy is formulated, the network flow with the commonality may be uniformly controlled and processed (for example, uniformly disconnected or connected). Consequently, the technical effect of efficiently and reasonably formulating a network control policy is realized, and the technical problem in related technologies that a basis for formulating a network control policy cannot be provided from complex network information due to a complex network topology is solved.

In addition, by clustering the network flow, the embodiments of the disclosure provide more efficient and understandable policy suggestions for a network administrator, and help the network administrator understand the characteristics of the current network flow and formulate the appropriate network control policy. In addition, the embodiments of the disclosure may optimize adaptive learning so that a result of the adaptive learning can realize the formulation of the network control policy more effectively.

As an optional embodiment, that the discrete object is clustered to obtain the clustering result includes that: an HAC method is used to cluster the discrete object to obtain the clustering result. The HAC method is a method for clustering a plurality of objects to be clustered. The method does not need to select an initial point of clustering and the number of clustering manually, but automatically. The HAC method is briefly described below. First, each object is taken as an independent cluster, all the clusters are traversed, and the distance between any two clusters is calculated. Then, the two clusters closest to each other are synthesized into one, and the coordinates of the new cluster is the coordinates of the midpoint of a connecting line between the two clusters. The above agglomerating operation is repeated, each time the two clusters are agglomerated, the total number of the clusters is reduced by 1, and finally all the objects will be agglomerated to one cluster.

Figure 2:
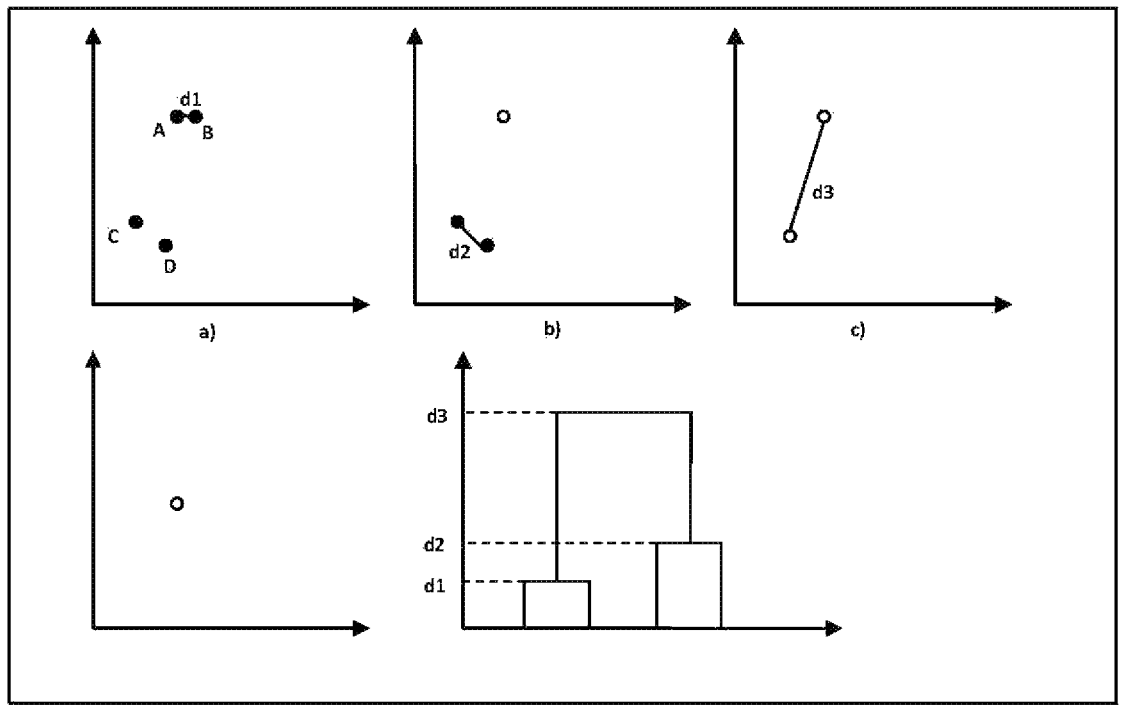
FIG. 2 is a schematic diagram of an HAC clustering algorithm according to an embodiment of the disclosure.

FIG. 2 is a schematic diagram of the HAC method according to an embodiment of the disclosure, As shown in FIG. 2, there are four clusters A, B, C and D at the beginning. In a), the two clusters A and B closest to each other are agglomerated into one cluster. In b), the two clusters C and D closest to each other are agglomerated into one cluster. In c), the two agglomerated clusters are agglomerated into one cluster again. The HAC method has an adjustable parameter, that is, the maximum clustering distance d. It can be seen from e) that when an aggregation distance is d1, there are three clusters; when the aggregation distance is d2, there are two clusters; and when the aggregation distance is d3, there is only one cluster.

As an optional embodiment, that the HAC method is used to cluster the discrete object to obtain the clustering result includes that: according to a source IP address and a destination IP address of the network flow as the discrete object, the HAC method is used to cluster the discrete object to obtain the clustering result. The source IP address and the destination IP address of the network flow as the discrete object are taken as a basis of clustering. According to the source IP addresses and the destination IP addresses of two discrete objects, the degree of similarity of the two discrete objects is judged to realize the clustering of the discrete objects.

It can be seen from the HAC method that the maximum agglomeration distance is the main factor of affecting the clustering result. Therefore, as an optional embodiment, the clustering results corresponding to multiple agglomeration distances may be provided. For example, when the discrete object is clustered to obtain the clustering result, a plurality of agglomeration distance ladder values may be determined; and according to the plurality of agglomeration distance ladder values, the discrete object is clustered to obtain a plurality clustering results corresponding respectively to the plurality of agglomeration distance ladder values. As an optional embodiment, a hierarchical clustering result display where the maximum agglomeration distance goes from large to small may be provided, which facilitates the network administrator to select the best clustering result.

Figure 3:
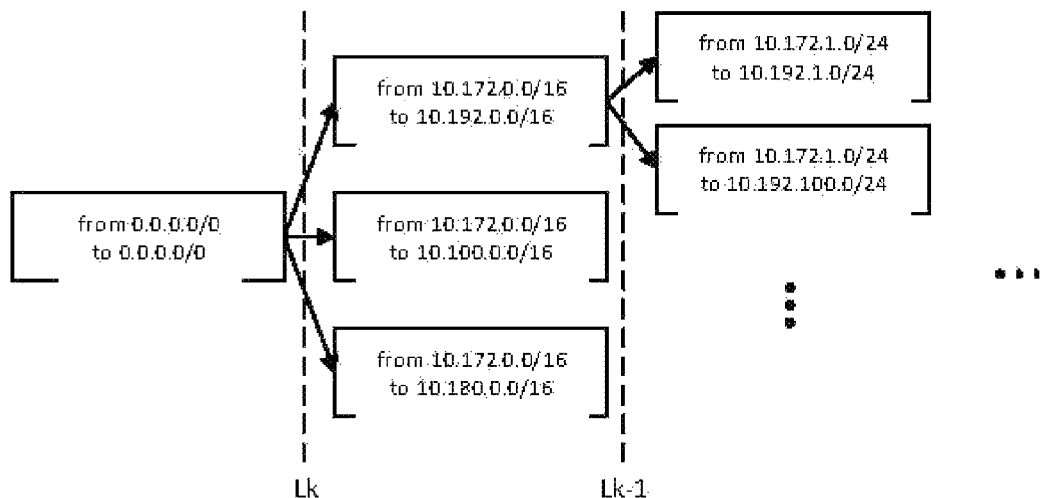
FIG. 3 is a schematic diagram of a hierarchical clustering result according to an embodiment of the disclosure.

It is assumed that there are n clusters at the beginning, and one cluster will be obtained after n-1 aggregation operations. There are a total of n-1 aggregation distances in the agglomeration process, that is, $d_1 \leq d_2 \leq \ldots d_{n-1}$. The agglomeration distance ladder values are defined as $l_0 \leq l_1 \leq \ldots l_k$, so that the n-1 agglomeration distances are non-uniformly distributed between every two adjacent agglomeration distance ladder values. Finally, taking the agglomeration distance ladder value as the boundary, the clustering results are displayed hierarchically. FIG. 3 is a schematic diagram of hierarchical clustering results according to an embodiment of the disclosure. As shown in FIG. 3, the clustering results may be controlled by the ladder value 1 as needed and displayed hierarchically.

It is to be noted that the agglomeration distance may be regarded as a control parameter for clustering. When the discrete object is clustered to obtain the clustering result, the clustering may also be controlled according to other parameters. As an optional embodiment, that the discrete object is clustered to obtain the clustering result includes that: a clustering control parameter is obtained; according to the clustering control parameter, the discrete object is filtered to obtain a filtering result; and the filtering result is clustered to obtain the clustering result. The clustering control parameter may also include multiple, for example, ports of the network flow. The ports include a source port and a destination port of the discrete object.

There are two ways in which the source/destination port of the discrete object participates in clustering display as follows:

it does not affect a clustering process, and is displayed together merely as the affiliated content of the clustering result;

as the control parameter of clustering, it may be selected by users to filter the discrete object participating in clustering. For example, when the user specifies that only HTTP flow is clustered, only the objects with port numbers including 80 are clustered.

As an optional embodiment, taking the acquired network flow as the discrete object may be realized in a variety of ways. For example, the following ways may be used: firstly, characteristic information of the network flow is extracted, and the characteristic information may be various, such as the source IP address, the destination IP address, the source port number and the destination port number of the network flow; then, the characteristic information is preprocessed to obtain a preprocessing result, the preprocessing here may be various, for example, such as normalization processing to the IP address; finally, the preprocessing result is mapped to a point in a rectangular plane coordinate system, and the point is taken as the discrete object. By mapping the network flow to a point in the rectangular plane coordinate system, the clustering result can be intuitively embodied.

When a certain one of the source address or the destination address in clustering data converges and the other one diverges, a clustering effect is not ideal. As an optional embodiment, in order to obtain a better clustering effect, when the preprocessing result is mapped to a point in the rectangular plane coordinate system, the following processing may be adopted: it is determined whether the degree of divergence of the characteristic information used for clustering reaches a predetermined threshold, and the predetermined threshold may be obtained empirically or statistically; when the degree of divergence of the characteristic information used for clustering reaches the predetermined threshold, the coordinates of the preprocessing result are adjusted to obtain a preprocessing result after the coordinates are adjusted; and the preprocessing result after the coordinates are adjusted is mapped to a point in the rectangular plane coordinate system. Adjusting the coordinates may adjust to scale the original coordinates in the coordinate system, or directly adjust to scale the coordinate values of the discrete objects participating in the clustering. The specific way may be flexibly chosen according to needs.

Figure 4:
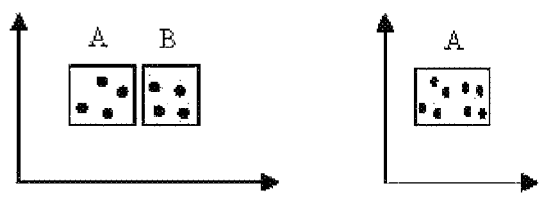
FIG. 4 is a schematic diagram of optimizing a clustering result by means of coordinate scaling according to an embodiment of the disclosure.

For example, it is expected that a policy configuration converted by the cluster after clustering is from 10.100.1.101/30 to 10.100.2.0/24. The cluster corresponds to a long and narrow rectangle in a clustering coordinate system, which is easy to be clustered into multiple clusters. In order to cope with the situation, a method of coordinate scaling is used to project the more divergent one in the coordinate system more convergently to get a better clustering result. FIG. 4 is a schematic diagram of optimizing a clustering result by means of coordinate scaling according to an embodiment of the disclosure. As shown in FIG. 4, in a coordinate system with normal proportion, eight clusters may be clustered into two clusters A and B. By changing the proportion of the coordinates, the diverging one becomes convergent, and a better clustering result can be obtained by using an algorithm.

In specific applications, if the network administrator knows that the source address diverges (understanding the network or approximately understanding the characteristics of the network flow due to using this scheme to cluster the network flow first), the network administrator may specify a "converged source address" scheme. In this case, when the source address IP is mapped to the rectangular plane coordinate system, a coefficient $y(y<1)$ is added to map the source addresses to the coordinate system convergently.

Maintenance ways may vary from network to network. For example, the maintenance way in a network using a physical machine is different from that in a network using a VM. In the method for processing the network flow of the present solution, in order to achieve efficient clustering, different distance representation modes may be used to cluster the network flow transmitted in different networks.

As an optional embodiment, when the network flow is the network flow transmitted in the network using the physical machine, the agglomeration distance used in the HAC method includes the Chebyshev distance. In the HAC method, the basis for clustering is the distance between two clusters. In the HAC method, the two clusters closest to each other in the coordinate system space are clustered into one new cluster, then all the clusters are traversed again to find the new clusters closest to each other, and the next clustering is performed. When the network flow is the network flow transmitted in the network using the physical machine, the characteristic of the network flow is that the source IP addresses of multiple pieces of network flow are usually concentrated, and their destination IP addresses are also usually concentrated. Therefore, the corresponding region of a network policy obtained by clustering is a square or rectangle in the coordinate system space where the clustering operation is performed. For example, if the policy configuration converted by a certain cluster after clustering is from 10.100.1.0/24 to 10.100.2.0/24, the corresponding region of the clustering is a square in the coordinate system space where the clustering operation is performed. According to the characteristic, by using the Chebyshev distance to evaluate the distance between two clusters, a good clustering effect may be obtained. The formula of the Chebyshev distance is:

$$d=\max(\mathrm{abs}(x_1-x_2), \mathrm{abs}(y_1-y_2))$$

where d is the distance between cluster 1 and cluster 2, $x_1$ is the x-coordinate of the cluster 1, $x_2$ is the x-coordinate of the cluster 2, $y_1$ is the y-coordinate of the cluster 1, and $y_2$ is the y-coordinate of the cluster 2.

Figure 5:
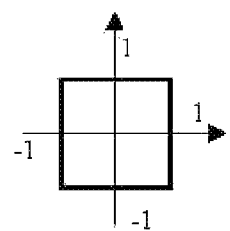
FIG. 5 is a schematic diagram of calculating the Chebyshev distance according to an embodiment of the disclosure.

FIG. 5 is a schematic diagram of calculating the Chebyshev distance according to an embodiment of the disclosure. As shown in FIG. 5, when a cluster is at the origin, the region with the Chebyshev distance away from the cluster is a square.

As an optional embodiment, when the network flow is the network flow transmitted in a cloud network using the VM, the agglomeration distance used in the HAC method is determined according to a first distance and a second distance, and the weights of the first distance and the second distance. The first distance is the distance between source VMs of two pieces of network flow used for clustering, and the second distance is the distance between destination VMs of two pieces of network flow used for clustering. Because the network environment is flat in the cloud network using the VM, and the IP addresses of the VMs are allocated more chaotically than in a traditional network environment, using the Chebyshev distance to define the distance between two pieces of network flow cannot achieve good clustering effect. For the flat cloud platform network environment, the clustering effect may not be guaranteed. In the embodiment of the disclosure, a method of defining the distance between two VMs in terms of an address book and joint probability is used to solve the above problem. As at least one alternative embodiment, the distance between two VMs will be illustrated below according to the embodiments of the disclosure.

Because each east-west flow in the cloud is from one VM to another VM, and the IP address corresponding to the VM is chaotic and difficult to manage and maintain, the VM and the address book to which the VM belongs to may be directly used to define the distance between two pieces of network flow. When the network flow flows from $VM_{\alpha x}$ to $VM_{\alpha y}$, the network flow is denoted as: $F_\alpha: VM_{\alpha x} \sim VM_{\alpha y}$. By processing a flow log, we may obtain multiple network flows $F_1 \sim F_n$. In order to use the HAC method to cluster $F_1 \sim F_n$ into several clusters, we also need to find a way to evaluate the distance between $F_\alpha$ and $F_\beta$.

The VMs in a cloud platform are generally divided by functionality, and each VM belongs to one or more address books.

If there are N address books, and $VM_\alpha$ belongs to M of N address books, wherein M is less than or equal to N, then $$P_{(VM_{\alpha x})} = M/N.$$

If the source VMs corresponding to the two network flows $F_\alpha$ and $F_\beta$ are respectively denoted as $VM_{\alpha x}$ and $VM_{\beta x}$, then a conditional probability that the address book including $VM_{\alpha x}$ also contains $VM_{\beta x}$ is:

$P_{(VM_{\beta x}|VM_{\alpha x})}$=the number of the address books including $VM_{\alpha x}$ and $VM_{\beta x}$/the number of the address books including $VM_{\alpha x}$;

based on this, the distance between $VM_{\alpha x}$ and $VM_{\beta x}$ is defined as:

$$d_{VM_{\alpha x}VM_{\beta x}} = 1 - P_{(VM_{\beta x}|VM_{\alpha x})} \cdot P_{(VM_{\alpha x})},$$

where $d_{VM_{\alpha x}VM_{\beta x}}$ represents the distance between $VM_{\alpha x}$ and $VM_{\beta x}$, and $P_{(VM_{\beta x}|VM_{\alpha x})}$ and $P_{(VM_{\alpha x})}$ are defined as above. It is apparent that according to the above definition formula, the greater the probability that two VMs belong to the same address book, the smaller the distance between the two VMs is judged, that is, the closer the two VMs are.

By using the same method as above, the distance between the destination VMs corresponding respectively to two network flows $F_\alpha$ and $F_\beta$ may be defined, and denoted as $d_{VM_{\alpha y}VM_{\beta y}}$, $$d_{VM_{\alpha y}VM_{\beta y}} = 1 - P_{(VM_{\beta y}|VM_{\alpha y})} \cdot P_{(VM_{\alpha y})}.$$

Through the above calculation, the distance between the source VMs and the distance between the destination VMs of two network flows are obtained. Accordingly, the distance between two network flows may be defined in terms of the distance between the source VMs and the distance between the destination VMs and the weight of each distance. For example, $$D_{F_\alpha F_\beta} = d_{VM_{\alpha x}VM_{\beta x}} + \gamma d_{VM_{\alpha y}VM_{\beta y}},$$

where $D_{F_\alpha F_\beta}$ is the distance between $F_\alpha$ and $F_\beta$, $d_{VM_{\alpha x}VM_{\beta x}}$ is the distance between the source VMs of $F_\alpha$ and $F_\beta$, $d_{VM_{\alpha y}VM_{\beta y}}$ is the distance between the destination VMs of $F_\alpha$ and $F_\beta$, and $\gamma$ is a weight parameter representing the distance between the source VMs and the distance between the destination VMs.

By the above method, the distance between two network flows transmitted in the cloud is represented. According to the above method of representing the distance, the network flow in the cloud network environment may be preliminarily clustered well. After the network flow is clustered for several times, multiple clusters may be obtained. Each cluster includes multiple network flows, which also means that each cluster includes multiple source VMs and multiple destination VMs. At this point, a multidimensional joint probability may be used to evaluate the distance between any two clusters, so that the HAC method using the address book to represent the distance may be performed stably until multiple clusters that are not clustered meet a preset termination condition. By using the distance represented by the distance representing mode to perform HAC calculation, the network flows in the cloud may be well clustered together, at the same time, the clustering result may be easily output to the user in the form of address book for viewing, as well as for subsequent maintenance and management.

As an optional embodiment, based on the difference of the above networks, the output clustering results may also be different, for example, when the network flow is the network flow transmitted in the network using the physical machine, the clustering result is output in the form of IP/Mask format; and when the network flow is the network flow transmitted in the cloud network using the VM, the clustering result is output in the form of address book. The above two cases are explained below.

All discrete source/destination IP addresses in a cluster are output in two forms: IP/Mask format and address book matching.

(1) Output in an IP/Mask format:

the source/destination IP addresses of all the discrete objects in a cluster are output in one or several address segments of the IP/Mask format. For example, when the network flow is the network flow transmitted in the network using the physical machine, a terminal accesses the Internet through a network built by a multilevel router, so the source/destination IP addresses clustered in a cluster are more likely to be in the same network segment. This output mode is more suitable for the network environment.

When the clustering result is output, two IP/Mask output modes may be provided for the user to choose on demand, that is, a compact mode and a strict mode. The difference between the two modes is explained below through the implementation principle of an output algorithm.

Figure 6:
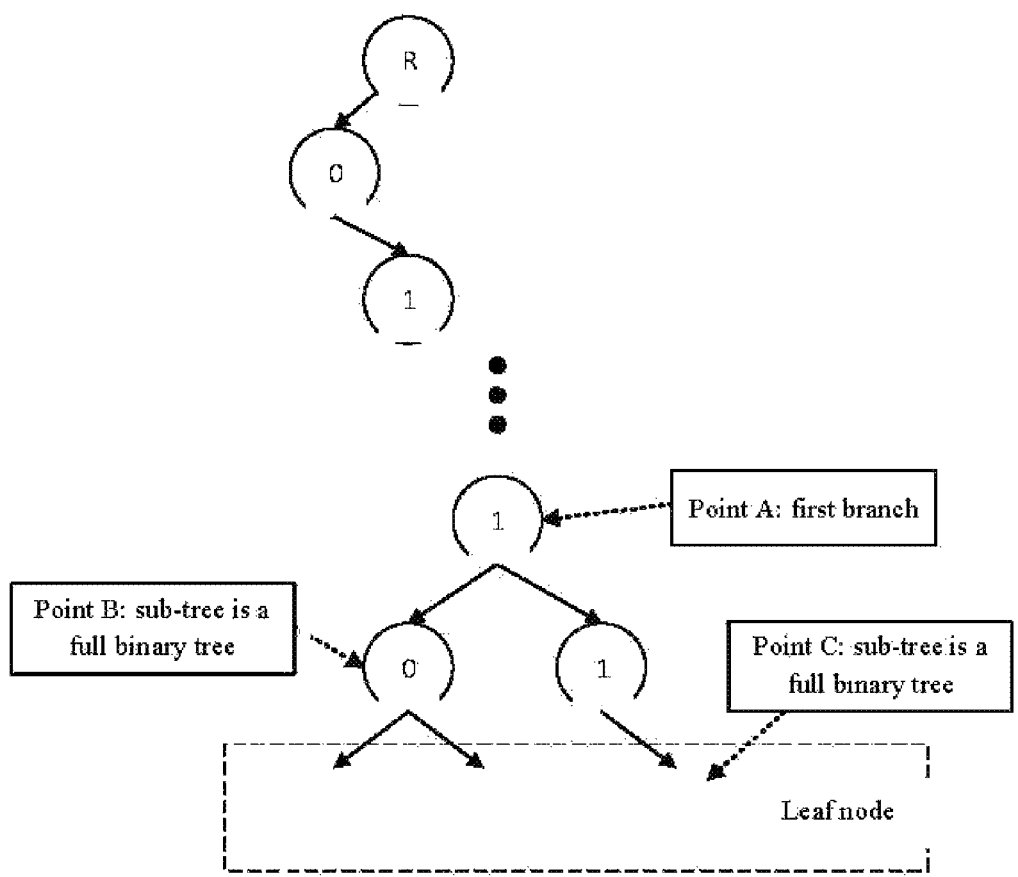
FIG. 6 is a schematic diagram of a binary tree formed by IP address sets according to an embodiment of the disclosure.

The cluster of IPV4 addresses is taken as an example to illustrate. FIG. 6 is a schematic diagram of a binary tree formed by the IP address sets according to an embodiment of the disclosure. As shown in FIG. 6, the IPV4 address has a total of 32 bits, and all the IP addresses in the cluster are built into a binary tree with a depth of 33 (a root node is meaningless) in a descending order. If a bit is 0, it is the left sub-tree, and if a bit is 1, it is the right sub-tree.

The compact mode: the IP/Mask address is output according to the first branching point of the IP binary tree, as point A in the figure above. The IP cluster that forms the binary tree is clustered and has a certain commonality. Therefore, by outputting the IP/Mask address according to the location of point A, the network may be displayed as simple as possible while most of requirements are satisfied.

The strict mode: the IP/Mask address is output according to root node of the maximum full binary tree. As point B in the figure above, a sub-tree taking the point B as its root node is a full binary tree, and an IP/mask address segment may be used to represent all nodes of the sub-tree taking B as its root node. When the smallest sub-tree is a sub-tree with only one root node (corresponding to point C in the figure above), the output mask is 32. The result output in the strict mode is in strict agreement with the IP address in the cluster, neither more nor less.

(2) Output by means of address book matching:

for some users using the address book to perform policy configuration, especially the flat network environment on the cloud platforms, the users tend to divide the terminals with similar functions into the same address book. At this point, the maintainability of using the address book in policy configuration is much higher than using the IP/Mask address segment.

The embodiment of the disclosure may match the IP addresses in the cluster with one or several address books and output matched clustering results in the form of address book, for example, $$\text{from} \begin{cases} \text{addressbookA}_1 \\ \text{addressbookA}_2 \end{cases} \text{to} \begin{cases} \text{addressbookB}_1 \\ \text{addressbookB}_2 \\ \text{addressbookB}_3 \end{cases}$$

An address book matching algorithm is implemented as follows.

At S1, first it is checked whether each IP address in the cluster is included in each address book. Table 1 is a schematic table showing whether each IP address in the cluster is included in each address book provided according to the embodiment of the disclosure.

TABLE 1

|  | addressbookA | addressbookB | ... | addressbookM |
|---|---|---|---|---|
| IP1 | Included | Not included |  | Included |
| IP2 | Included | Not included |  | Not included |
| ... |  |  |  |  |
| IPn | Included | Not included |  | Included |

At S2, an inclusion rate is calculated, that is, a is a ratio of the number of the IP addresses included in the cluster to the total number of the IP addresses in the address book.

At S3, in order to prevent the user from having a wide range of address books, the address books with too low a are filtered out based on an empirical value or user-specified value.

At S4, the address book including the maximum number of IP addresses is selected from the remaining address books as the first round of output; if several address books have the same number of IP addresses, the one with low α is selected.

At S5, the IP address in the selected address book is removed from the cluster, and S1 to S5 are repeated with the remaining IP addresses until all the IP addresses are found, or the remaining IP addresses are not included in any address book.

When the user's address book is properly planned, all the IP addresses in the cluster may be found after 1 or 2 rounds of calculation. The above algorithm may display the clustering result for the user in the form of address book and recommend the policy configuration.

It is to be noted that the solution for processing the network flow provided by the embodiment of the disclosure may be applied to a variety of scenarios; for example, it can be applied to traditional firewall devices, a public cloud, a private cloud, an adaptive policy recommendation of data center, and firewall policies of other complex network environments.

Based on the above embodiments and optional embodiments, the following processing is adopted: the source/destination IP in the flow log is extracted, and flow log characteristics are projected into the rectangular plane coordinate system; the flow log is analyzed by using a unsupervised clustering algorithm and a policy configuration suggestion is provided; the Chebyshev distance is used as an evaluation value of the agglomeration distance; a way of coordinate scaling is used to optimize the clustering effect; the discrete joint probability of the VM is used to calculate the evaluation value of the agglomeration distance; and after matching the user's address book, the clustering result is output in the form of address book. In this way, an intelligent policy suggestion can be provided to facilitate the network administrator to manage the firewall policies more quickly and efficiently.

Embodiment 2

Figure 7:
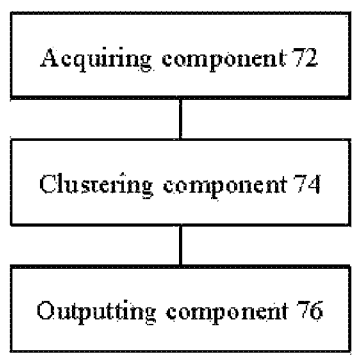
FIG. 7 is a structure diagram of a device for processing a network flow according to an embodiment of the disclosure.

According to the embodiments of the disclosure, a device used for the method for processing a network flow is also provided. FIG. 7 is a structure diagram of a device for processing a network flow according to an embodiment of the disclosure. As shown in FIG. 7, the device includes: an acquiring component 72, a clustering component 74 and an outputting component 76. The device is described below.

The acquiring component 72 is configured to acquire the network flow and take the acquired network flow as the discrete object. The clustering component 74 is connected to the acquiring component 72 and configured to cluster the discrete object to obtain the clustering result. The outputting component 76 is connected to the clustering component 74 and configured to output the clustering result.

Figure 8:
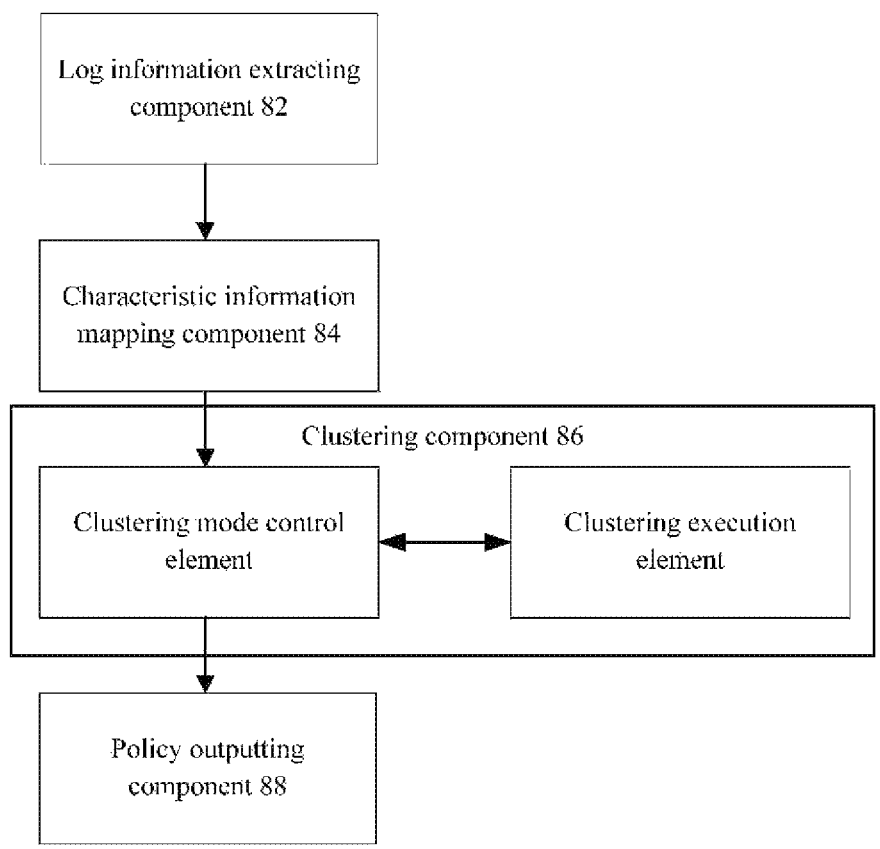
FIG. 8 is a structure diagram of a network policy clustering device according to an embodiment of the disclosure.

According to an optional embodiment of the disclosure, based on the method for processing a network flow, a network policy clustering device is provided. According to information provided by the flow log, the device uses the unsupervised clustering algorithm to cluster the policies and output more concise and high operational policy suggestions, so as to help the network administrator to configure the policy more quickly. FIG. 8 is a structure diagram of a network policy clustering device according to an embodiment of the disclosure. As shown in FIG. 8, the network policy clustering device includes: a log information extracting component 82, a characteristic information mapping component 84, a clustering component 86 and a policy outputting component 88. The log information extracting component 82 and the characteristic information mapping component 84 realize the function of the acquiring component 72, the clustering component 86 realizes the function of the clustering component 74, and the policy outputting component 88 is the same as the outputting component 76. These components are respectively explained below.

The log information extracting component 82 is configured to extract the source/destination IP address of each flow and the source/destination port number from the flow log, and remove repetition. After processing, a number of discrete objects to be clustered after removing repetition are obtained, and each object includes parameters of 4 dimensions.

The characteristic information mapping component 84 is connected to the log information extracting component 82, and is configured to map the discrete object to be clustered to a point in the rectangular plane coordinate system, wherein the source/destination IP address of the discrete object to be clustered is taken as the x-coordinate and the y-coordinate in the rectangular plane coordinate system.

Taking the source IP address as an example, first, the minimum value and the maximum value of the IP addresses of all objects are obtained, then the IP address of each object is normalized, and the normalized value is mapped to an unsigned 32-bit number which is taken as the x-coordinate of the object in the rectangular plane coordinate system. Similarly, the destination IP address is mapped to the y-coordinate of the rectangular plane coordinate system.

The clustering component 86 is connected to the characteristic information mapping component 84, including: a clustering execution element and a clustering mode control element. The clustering execution element is configured to use the HAC method to cluster the mapped discrete object. The clustering mode control element is configured to receive some user parameters, and control the clustering execution element to obtain a better clustering result.

The policy outputting component 88 is connected to the clustering component 86, and is configured to output the clustering result. For example, all the discrete source/destination IP addresses in a cluster may be output in two forms: IP/Mask format and address book matching.

The embodiments of the disclosure may provide a computer terminal. The computer terminal may be any computer terminal device in a group of computer terminals. As at least one alternative embodiment, the computer terminal may also be replaced with the mobile terminal and other terminal devices.

As at least one alternative embodiment, the computer terminal may be in at least one of multiple network devices of a computer network.

As at least one alternative embodiment, the computer terminal may include: one or more processors, memories, and so on.

The memory stores a computer program, which may be configured to store a software program and module, for example, a program instruction/module corresponding to the method for processing a network flow and device in the embodiments of the disclosure. The processor executes various function applications and data processing by running the software program and module stored in the memory, namely implementing the method for processing a network flow. The memory may include a high-speed RAM, and may also include a nonvolatile memory, for example, one or more than one magnetic storage device, a flash memory, or other nonvolatile solid state memory. In some examples, the memories may further include memories remotely set relative to the processor, and these remote memories may be connected to the computer terminal through the network. An example of the network includes, but not limited to, the Internet, an intranet, a local area network, a mobile communication network and a combination thereof.

The processor may call information and application program stored in the memory by means of a transmission device to execute the computer program stored in the memory. When running, the computer program makes the processor execute any of the method for processing a network flows described above.

Those of ordinary skill in the art may understand that all or part of the steps in the method of the above embodiments may be performed by hardware related to the terminal devices instructed by a program. The program may be stored in computer readable storage media. The storage media may include: a flash disk, a Read-Only Memory (ROM), an RAM, a magnetic disk or a compact disc.

The embodiments of the disclosure also provide a storage medium. As at least one alternative embodiment, in the embodiment, the storage medium may be used to save program codes executed by the method for processing a network flow provided in embodiment 1 above, and control the device in which the storage medium is to execute any of the method for processing a network flows described above while the program is running. The sequence numbers of the embodiments of the disclosure are just for describing, instead of representing superiority-inferiority of the embodiments.

In the above embodiments of the disclosure, the descriptions of the embodiments focus on different aspects. A part which is not described in a certain embodiment in detail may refer to the related description of the other embodiments.

In the several embodiments provided in the application, it should be understood that the technical contents disclosed may be realized in other ways. The embodiment of the device described above is only schematic; for example, the division of the units is only a division of logical functions, and there may be other dividing modes during the actual implementation, for example, multiple units or components may be combined or integrated to another system, or some features may be ignored or are not executed. In addition, coupling, direct coupling, or communication connection shown or discussed may be implemented through indirect coupling or communication connection of some interfaces, units or modules, and may be in an electrical form or other forms.

The units described as separate parts may be or may not be separate physically. The part shown as the unit may be or may not be a physical unit, that is to say, it may be in a place or distributed on multiple network units. Part or all of the units may be selected to achieve the purpose of the solutions of the embodiments according to a practical requirement.

Moreover, all the function units in the embodiments of the disclosure may be integrated in a processing unit; or the units exist separately and physically; or two or more than two units are integrated in a unit. The integrated unit may be realized in form of hardware or in form of software function unit.

If the integrated unit is implemented by software function modules, and the software function modules are sold or used as independent products, they can also be stored in a computer readable storage medium. Based on this understanding, the technical solution of the embodiments of the disclosure substantially or the part making a contribution to the conventional art can be embodied in the form of software product; the computer software product is stored in a storage medium, and includes a number of instructions to make a computer device (which may be a personal computer, a server or a network device, etc.) perform all or part of steps of the method in each embodiment of the disclosure. The storage media include, but not limited to, a USB flash disk, an ROM, an RAM, a mobile hard disk, a magnetic disk, a compact disc, and other media capable of storing the program codes.

The above is only the preferred embodiments of the disclosure; it should be indicated that, on the premise of not departing from the principles of the disclosure, those of ordinary skill in the art may also make a number of improvements and supplements, and these improvements and supplements should fall within the protection scope of the disclosure.

What is claimed is:

1. A method for processing a network flow, comprising:
acquiring a network flow, and taking the acquired network flow as a discrete object;
clustering the discrete object to obtain a clustering result;
outputting the clustering result; and
formulating a network control policy according to the clustering result;
wherein clustering the discrete object to obtain the clustering result comprises using a Hierarchical Agglomerative Clustering (HAC) method to cluster the discrete object to obtain the clustering result;
wherein using the HAC method to cluster the discrete object to obtain the clustering result comprises according to a source IP address and a destination IP address of the network flow as the discrete object, using the HAC method to cluster the discrete object to obtain the clustering result; and
wherein when the network flow is a network flow transmitted in a cloud network using a Virtual Machine (VM), an agglomeration distance used in the HAC method is determined according to a first distance and a second distance, and weights of the first distance and the second distance, wherein the first distance is a distance between source VMs of two network flows for clustering, and the second distance is a distance between destination VMs of two network flows for clustering.

2. The method as claimed in claim 1, wherein when the network flow is a network flow transmitted in a network using a physical machine, an agglomeration distance used in the HAC method comprises the Chebyshev distance.

3. The method as claimed in claim 2, wherein taking the acquired network flow as the discrete object comprises:
extracting characteristic information of the network flow;
preprocessing the characteristic information to obtain a preprocessing result; and
mapping the preprocessing result to a point in a rectangular plane coordinate system, and taking the point as the discrete object.

4. The method as claimed in claim 1, wherein outputting the clustering result comprises:
when the network flow is a network flow transmitted in a network using a physical machine, outputting the clustering result in a form of IP/Mask format; and
when the network flow is a network flow transmitted in a cloud network using a VM, outputting the clustering result in a form of address book.

5. The method as claimed in claim 4, wherein taking the acquired network flow as the discrete object comprises:
extracting characteristic information of the network flow;
preprocessing the characteristic information to obtain a preprocessing result; and
mapping the preprocessing result to a point in a rectangular plane coordinate system, and taking the point as the discrete object.

6. The method as claimed in claim 1, wherein clustering the discrete object to obtain the clustering result comprises:
determining a plurality of agglomeration distance ladder values; and
according to the plurality of agglomeration distance ladder values, clustering the discrete object to obtain a plurality clustering results corresponding respectively to the plurality of agglomeration distance ladder values.

7. The method as claimed in claim 6, wherein taking the acquired network flow as the discrete object comprises:
    extracting characteristic information of the network flow;
    preprocessing the characteristic information to obtain a preprocessing result; and
    mapping the preprocessing result to a point in a rectangular plane coordinate system, and taking the point as the discrete object.

8. The method as claimed in claim 1, wherein clustering the discrete object to obtain the clustering result comprises:
    obtaining a clustering control parameter;
    according to the clustering control parameter, filtering discrete objects to obtain a filtering result; and
    clustering the filtering result to obtain the clustering result.

9. The method as claimed in claim 8, wherein the clustering control parameter comprises: a port of the network flow.

10. The method as claimed in claim 1, wherein taking the acquired network flow as the discrete object comprises:
    extracting characteristic information of the network flow;
    preprocessing the characteristic information to obtain a preprocessing result; and
    mapping the preprocessing result to a point in a rectangular plane coordinate system, and taking the point as the discrete object.

11. The method as claimed in claim 10, wherein mapping the preprocessing result to the point in the rectangular plane coordinate system comprises:
    determining whether a degree of divergence of the characteristic information for clustering reaches a predetermined threshold;
    when the degree of divergence of the characteristic information for clustering reaches the predetermined threshold, adjusting coordinates of the preprocessing result to obtain a preprocessing result after the coordinates are adjusted; and
    mapping the preprocessing result after the coordinates are adjusted to a point in the rectangular plane coordinate system.

12. The method as claimed in claim 11, wherein the method is applied to a flow control of a firewall.

13. A non-transitory computer-readable storage medium, comprising a program stored, wherein when running, the program controls a device where the storage medium is located to execute following actions:
    acquiring a network flow, and taking the acquired network flow as a discrete object;
    clustering the discrete object to obtain a clustering result; outputting the clustering result; and
    formulating a network control policy according to the clustering result;
        wherein clustering the discrete object to obtain the clustering result comprises using a Hierarchical Agglomerative Clustering (HAC) method to cluster the discrete object to obtain the clustering result;
    wherein using the HAC method to cluster the discrete object to obtain the clustering result comprises according to a source IP address and a destination IP address of the network flow as the discrete object, using the HAC method to cluster the discrete object to obtain the clustering result; and
    wherein when the network flow is a network flow transmitted in a cloud network using a Virtual Machine (VM), an agglomeration distance used in the HAC method is determined according to a first distance and a second distance, and weights of the first distance and the second distance, wherein the first distance is a distance between source VMs of two network flows for clustering, and the second distance is a distance between destination VMs of two network flows for clustering.

14. A computer device, comprising:
a memory and a processor;
the memory stores a computer program;
the processor is configured to execute the computer program stored in the memory; when running, the computer program makes the processor execute following actions:
    acquiring a network flow, and taking the acquired network flow as a discrete object;
    clustering the discrete object to obtain a clustering result; outputting the clustering result; and
    formulating a network control policy according to the clustering result;
        wherein clustering the discrete object to obtain the clustering result comprises using a Hierarchical Agglomerative Clustering (HAC) method to cluster the discrete object to obtain the clustering result;
    wherein using the HAC method to cluster the discrete object to obtain the clustering result comprises according to a source IP address and a destination IP address of the network flow as the discrete object, using the HAC method to cluster the discrete object to obtain the clustering result; and
    wherein when the network flow is a network flow transmitted in a cloud network using a Virtual Machine (VM), an agglomeration distance used in the HAC method is determined according to a first distance and a second distance, and weights of the first distance and the second distance, wherein the first distance is a distance between source VMs of two network flows for clustering, and the second distance is a distance between destination VMs of two network flows for clustering.

* * * * *